3,409,620
CONTINUOUS MANUFACTURE IN VACUUM OF NITRIC ESTERS AND/OR ORGANIC NITRO COMPOUNDS
Per Valter Ohman, Molle, Sweden, and Hanspeter Moser, Chatacombaz, Switzerland, assignors to Dr. Ing. Mario Biazzi Societe Anonyme, Vevey, Vaud, Switzerland
Continuation-in-part of application Ser. No. 425,224, Jan. 13, 1965. This application Feb. 6, 1967, Ser. No. 629,336
3 Claims. (Cl. 260—248.5)

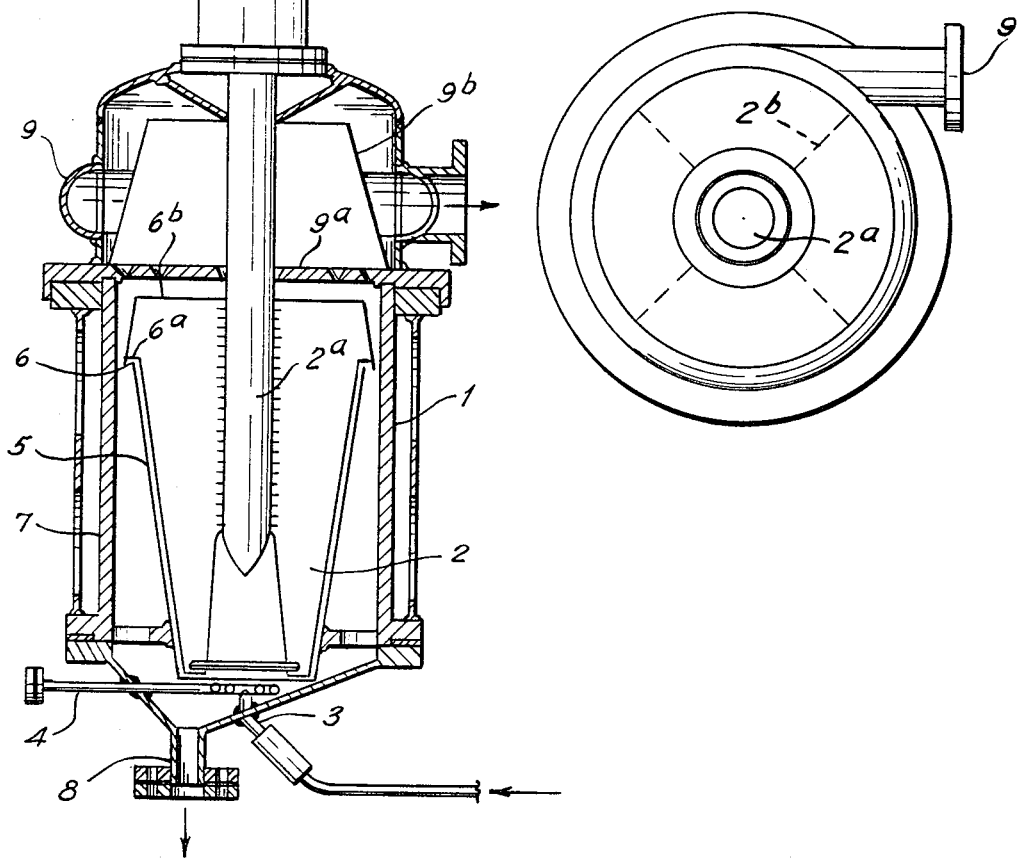

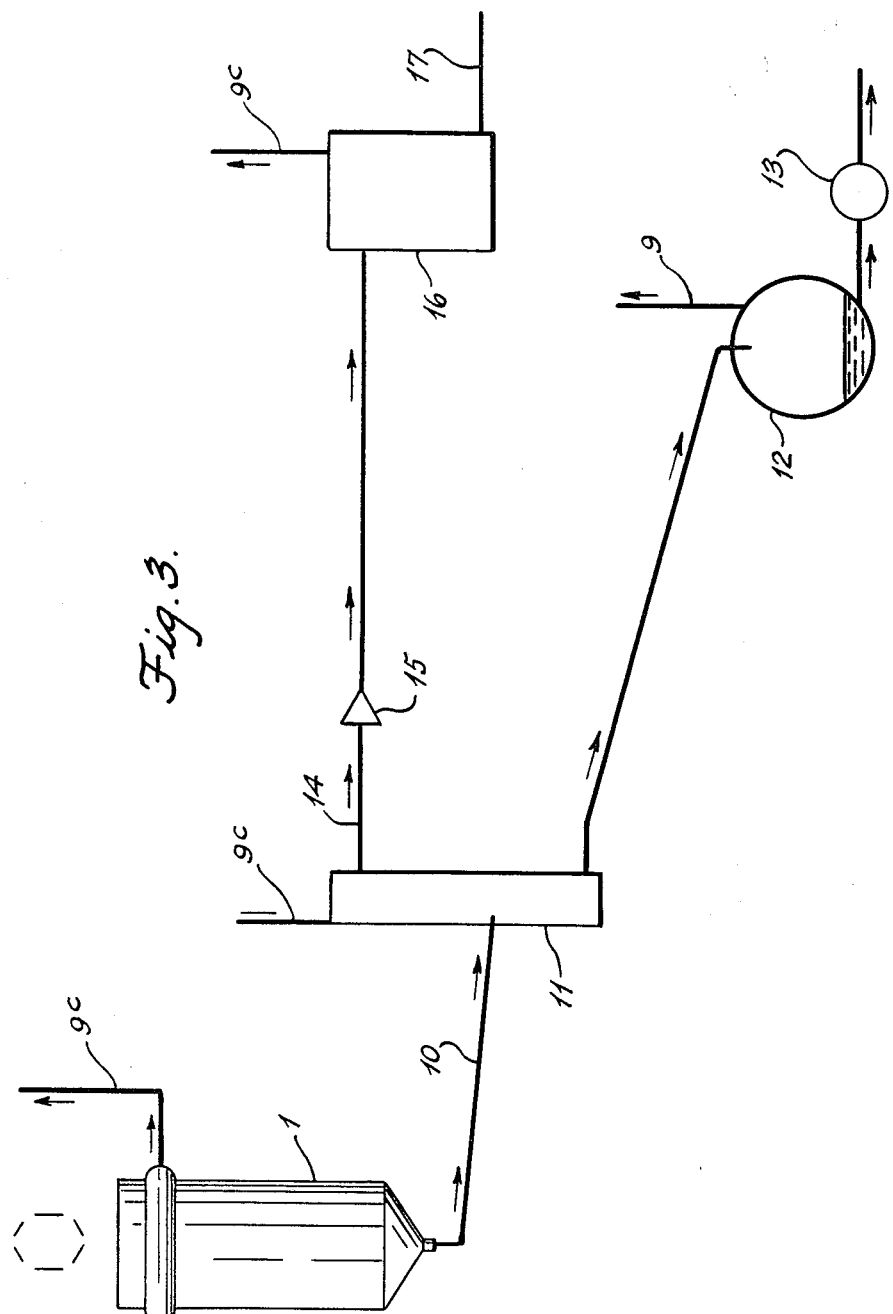

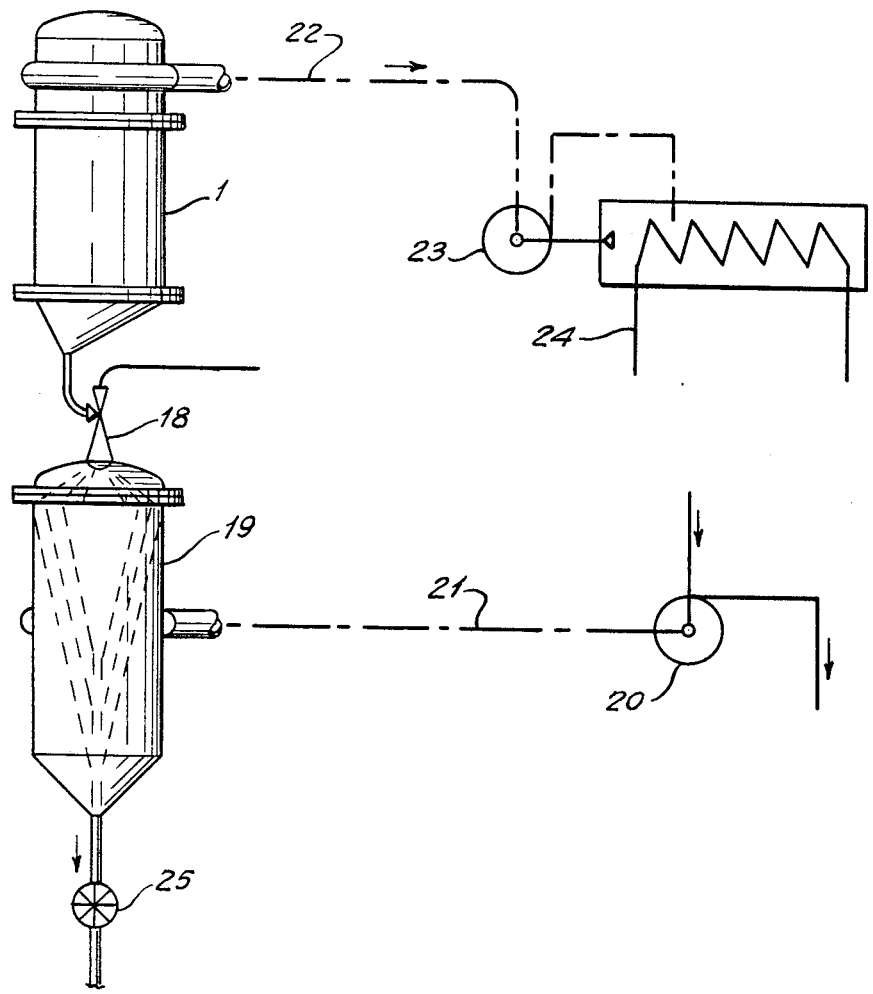

ABSTRACT OF THE DISCLOSURE

The method of the invention comprises continuously nitrating nitratable organic compounds with boiling points substantially higher than the boiling point of nitric acid to produce nitric esters or nitro-compounds. An organic compound of the indicated type is continuously mixed with an excess of concentrated nitric acid at a reduced pressure which is much lower than atmospheric pressure but higher than the pressure at which such organic compound and its nitrated product evaporate, continuously effecting the nitration of such organic compound at said reduced pressure, and continuously evaporating at said reduced pressure a sufficient quantity of the nitric acid for removing the heat evolved in the nitration reaction.

Cross-references to related applications

This application is a continuation-in-part of application Ser. No. 425,224, filed Jan. 13, 1965, now abandoned.

Background of the invention

Field of the invention.—The invention relates to a method of nitrating nitratable organic compounds. More specifically, the invention relates to the continuous nitrating of nitratable organic compounds having boiling points which are substantially higher than the boiling point of nitric acid.

Description of the prior art.—In the prior art organic compounds were first nitrated by the batch process. For many years it has been known that the nitrating process and the separation of the nitrated product are the most dangerous operations in the manufacture of nitric esters. Acidic nitric esters are very unstable, compared with the neutral nitric esters, and it is therefore important to reduce the amount of acidic nitric esters and to neutralize them as quickly as possible.

A great deal of progress was made when the batch process for quantities of 600–1,000 kgs. of nitro-glycerol was replaced by a continuous process. The quantity of nitro-glycerol in the nitrating house at a capacity of 1 ton per hour nitro-glycerol could thus be decreased to about 100 kg.

By using turbulent methods (see U.S. Patents Nos. 2,737,522, 2,951,866, and 3,111,538), the quantity of nitric ester in the nitrator and cooler can be further decreased. However, in these methods the nitrating temperature is rather high (about 45° C.).

By using the separator as a centrifuge (see U.S. Patent No. 520,267), either in conventional continuous methods or in turbulent methods, the quantity of acidic nitric esters can also be decreased in this part of the equipment.

In Patent No. 2,435,314 there is disclosed the nitrating of an organic compound under reduced pressure. Such method is of the batch type, however. Further, the organic compound is such that the nitrated compound is volatile, and is removed by evaporation from the spent acids.

Summary of the invention

The method of the invention continuously manufactures nitric esters and/or organic nitro compounds by nitration with nitric acid, or with mixtures of nitric acid with compounds having a very high affinity to water, for example, strong acids such as oleum (fuming sulphuric acid), sulphuric acid, phosphorus pentoxide and phosphoric acid, or mineral salts such as, for example, magnesium nitrate, calcium nitrate, and zinc nitrate. Nitric acid alone or any such mixture of nitric acid with such compounds, or any of them, are hereinafter referred to as nitrating acid.

Examples of esters which may be employed in accordance with the present invention are: glycerol (B.P. 290° C.), ethylene glycol (B.P. 197° C.), propene glycol (B.P. 188.2° C.) (propane diol), pentamethylene glycol (B.P. 239.4° C.) (pentane diol), diethylene glycol (B.P. 244.5° C.), tri-ethylene glycol (B.P. 280° C.), mannitol (B.P. 295° C. 3.5), sorbitol (B.P. >300° C.), and pentaerythritol (B.P. >300° C.). All of such enumerated compounds are polyalcohols; they and their nitrated products have boiling points substantially higher than that of nitric acid (86° C.). The nitric esters may be represented by the general formula

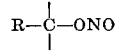

Examples of nitro-compounds which may be produced in accordance with the present invention are nitro-compounds of toluene, which has a boiling point of 110.6° C.; cymene, which has a boiling point ca. 175° C.; and hexamine, which sublimates at 263° C.; and the halogen derivatives of toluene and cymene. All of these compounds and their nitrated products have boiling points substantially higher than that of nitric acid. The nitro-compounds may be represented by the general formula

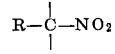

The main object of our invention is to reduce to a minimum the quantity of acidic ester or nitro-compound used in the nitration process. A further object of the invention is to reduce the retention time for the reaction components during the nitration process. A still further object of the invention is to stabilize the nitration system by performing nitration and separation of the nitrated product in vacuum. By means of our invention, we have overcome at least some of the weaknesses of the conventional continuous and turbulent methods. In such conventional low temperature continuous methods a rather long retention time must always be calculated. For example, for 1,000 kgs. nitroglycerine per hour, the shortest retention time in conventional methods is about 7 minutes, while in our method, the retention time is only about 10 seconds.

In conventional turbulent methods, the retention time is also very short, but in this case stored spent acid is circulated which may result in unstable compounds in the system. The high nitrating temperature is also a weakness when working in unstable systems.

Thus, the conventional methods now mentioned can be used only in cases of good chemical stability. Nitrating systems with very low stability, for example nitration of triethylene glycol or pentamethylene glycol (pentane diol), can not from a point of view of safety, be realized in these methods.

It is well known that the decomposition occurring in acidic nitric esters is autocatalytic and is increased by raising the $HNO_2$ content. Therefore, some recommendations have been made to add carbamide to "unstable nitrations." In our invention, however, carbamide can be added, if desired, but such an addition of carbamide is not necessary, since the whole system may be stabilized by nitration and separation under vacuum. At least three important advantages are obtained by performing the process in vacuum by evaporation. Thus first, $HNO_2$ and other nitrogen oxides, which can accelerate a decomposition, are immediately driven away. Secondly, in spite of the low retention time, the nitrating temperature can be kept at a low value and if a local decomposition starts, resulting in an increase of the temperature, such raising of the temperature and the subsequent decomposition will be suppressed or inhibited by evaporation. Thirdly, when a sufficient amount of $HNO_3$ is added, no further cooling is necessary, as the evaporation of the $HNO_3$ reduces the temperature to a sufficiently low value.

If, by nitration of glycerol, all the heat from the nitration is removed by evaporation of the nitric acid, 0.9 kg. $HNO_3$ per kg. nitroglycerol would be sufficient.

In most cases it is advisable to add a water absorber. In the normal methods, oleum and sulphuric acid are used. They can be used also in our method. By nitration in very unstable systems, however, it is, in accordance with the present invention, favorable to use a water absorbing agent, which does not have a strong affinity to nitrous acid, so that low nitrogen oxides easily can be left in vacuum. Sulphuric acid forms the relatively stable $HNOSO_4$. Phosphoric acid, on the other hand, does not retain the nitrous acid, but easily loses it under vacuum.

The water absorber can be added separately or in a mixture with $HNO_3$ (mixed acid). To prevent an increase of the water content, nitric acid with more than 99% $HNO_3$ should be used. The nitric acid steam is condensed in a condenser before and/or after the vacuum pump. An oil which is stable against nitrogen oxides, for example so called P.T.F.E. oil, can be used in the vacuum pump. However, inorganic acids are also very suitable, for example phosphoric acid. If a water ring pump is used, sulphuric acid, phosphoric acid, mixed acid, or nitric acid can be used instead of water. In connection with this invention, it is very favorable to use nitric acid, which must be cooled. A very interesting performance of the evacuation is obtained by using an injector driven by nitric acid. A small proportion of the nitric acid is circulated and cooled before being conveyed into the injector again.

To obtain the best cooling effect, it is preferred to add the water absorbing agent to the system a short time after the addition of the nitric acid. The water absorbing agent, nitric acid, and polyalcohol (or other hydrocarbon) are conveyed into the vacuum nitrator by means of nozzles. The mixture of gas and fine drops must be strongly rotated, and this can be arranged by constructing the vacuum vessel as a stationary propeller (cyclone), or by installing a propeller operating at a very high speed (number of revolutions).

The addition of nitric acid, polyalcohol (hydrocarbon), and water absorbing agent is proportionate to the safety and economic functions.

In unstable systems, it is very suitable to use a centrifuge as a separator. If a centrifuge can not be used, it is also necessary to arrange for operating the separator under vacuum. The separator must be fitted with a cooler. However, in very unstable systems, it is even necessary to drown the oil-spent acid mixture in water immediately after the nitration. If the acidic system is relatively stable, any normal type of separator can be used.

All operations now described above can be realized by some kind of control means, for example a thermometer, a rotating volume meter, a pH-meter, and a redox meter. The means can also be remote controlled or completely automatic.

Because of the evaporation of nitric acid under vacuum in accordance with the invention, there is obtained an effective cooling and thus temperature stabilization of the system. The temperature of the reactants never rises above the boiling point of nitric acid. There is also obtained a chemical stabilization of the system, because the nitrous acid is stripped from the formed nitrogen compounds and spent acid.

In methods wherein the manufactured nitrogen compound is volatile, on the other hand, when nitrous acid ($HNO_2$) strips from the spent acid, it follows the formed volatile nitrogen compounds instead of separating from them. Such latter system can not in the same degree, therefore, be chemically stabilized by the carrying out of the nitration process under vacuum.

Brief description of the drawings

Some embodiments of apparatus for the realization of the method according to the invention are shown schematically in the accompanying drawings, in which FIG. 1 is a vertical section of a nitrator;

FIG. 2 is a plan view of the nitrator according to FIG 1;

FIG. 3 is a flow diagram of a "full vacuum system," and

FIG. 4 shows a nitration plant in very unstable system.

Description of the preferred embodiments

In FIG. 1 the nitrator 1 is provided with a mixer or agitator 2 rotating by means of a shaft 2a. Polyalcohol and mixed acid (nitric acid together with some other strong acid) are supplied at the bottom of the nitrator through pipes 3 and 4, respectively. The mixer 2 has crossing radial walls or vanes 2b and is adapted to subdivide or atomize the liquids into fine drops which are thrown onto a surrounding stationary conical wall 5. The polyalcohol and the nitric acid are reacted to form a nitrated product which together with spent acid is raised by centrifugal power to the top rim 6 of the conical wall 5, and caused to pass through a gap 6a between rim 6 and a partly perforated cover 6b toward a cylindrical wall 7 of the nitrator. On this cylindrical wall the mixture of nitrated product and spent acid flows down to a discharge pipe 8, which, for example, can be connected directly to a vacuum separator or to a centrifuge through a sluice pump. The $HNO_3$-vapors developed during the nitration process pass through a perforated partition 9a and around a baffle 9b out through a pipe 9 connected to a vacuum pump.

FIG. 3 shows that from the nitrator 1, the mixture of nitrated product and spent acid passes through a pipe 10 to the vacuum separator 11 in which the nitrated product is separated from spent acid which passes to a small vacuum storing tank 12, from which the spent acid is continuously conveyed to a denitration equipment by means of a pump 13. The separated nitrated product which is an explosive oil, passes from separator 11 through pipe 14 and a water injector 15 to either of a pair of water-oil vacuum separators 16. These separators are regularly exchanged and emptied at atmospheric pressure. The oil phase is conveyed to a sodium carbonate washer through a discharge pipe 17. The pipes 9c shown in FIG. 3 are vacuum conduits connected to pipe 9 in FIG. 1.

FIG. 4 shows diagrammatically the nitration in very unstable systems. From the nitrator 1 the mixture of nitrated product and spent acid is conveyed by means of a water injector 18 to the top of a vacuum washer or scrubber 19. The vacuum in this scrubber is generated by means of a water ring pump 20, for instance, connected to the interior of the scrubber by means of a conduit 21. The $HNO_3$-vapors generated during the nitration in the nitrator 1 is passed through a pipe 22 to a $HNO_3$-ring pump 23 associated with a cooler 24 so as to condense the $HNO_3$ vapors.

The emulsion nitrated product and gas generated in the scrubber is withdrawn continuously from this scrubber by means of some favorable arrangement, such as an injector or a sluice valve 25.

Examples

The following experiments have been carried out in a round bottomed flask with a volume of about 1½ liter. The polyalcohol was added through a small glass tube inside a larger tube, through which the mixed acid was added. With this arrangement, it was possible to obtain a good contact between polyalcohol and mixed acid. A stainless steel funnel was fixed below the inlet to increase the retention time in the nitrating flask.

The mixture of spent acid and nitric esters was continuously sucked out and taken up, either in a rotating round bottomed flask that also was kept under vacuum, or in a flask containing ice.

Example 1

Alcohol—tri-ethylene glycol 15.0 g.=13.1 ml.
Mixed acid—6 g. $P_2O_5$+37.8 g. 99.6% $HNO_3$=43.8 g.=29 ml.

Performance of the experiment:

In the first three minutes the whole quantity of mixed acid and 64% of the tri-ethylene glycol was added. The remaining quantity of the tri-ethylene glycol was added together with 30 ml. 99.6% $HNO_3$ in the subsequent 10 minutes. The pressure during the whole experiment was 26 mm. During the fast nitration in the first part of the experiment, the temperature varied between 32 and 40° C. During the comparatively slow addition at the end of the experiment, the temperature was kept between 13 and 33° C. During the whole experiment the spent acid and the oil phase (nitrated product) were stored in vacuum and were absolutely colorless.

The mixture of spent acid and oil was mixed with about 5 times as much water. 20.9 g. tri-ethylene glycol dinitrate with a nitrogen content of 12.37% was separated from the water mixture. The water phase was extracted with ether. The ether extract amounted to 3.87 g. with 11.10% nitrogen. The total quantity was therefore 23.87 g. and the yield 99.5%.

Example 2

Alcohol—Propane diol, 7.69 g.=7.5 ml.
Mixed acid—158 g. (105 ml.) 99.6% $HNO_3$.

Performance of the experiment:

For 24 minutes the propane diol and the nitric acid were added. During the whole time the nitrating temperature was 11° C. The pressure was 26 mm. In this case, the mixture of nitric acid and nitrated product was directly transferred to an ice-water mixture, which later on was extracted with ether.

Quantity propane diol dinitrate obtained—13.00 g.
Nitrogen content—15.51%.
Yield—77.5%.

Example 3

Alcohol—Pentane diol 13.63 g.=13.7 ml.
Mixed acid—162 g. (108 ml.) 99.6% $HNO_3$.

Performance of the experiment:

For three minutes, the pentane diol and the nitric acid were added. The temperature varied between 18 and 32° C., and the pressure between 18 and 43 mm. The mixture of nitric acid and nitrated product was transferred directly to an ice-water mixture, which was extracted later on with ether.

Quantity of pentane diol dinitrate obtained—19.59 g.
Nitrogen content—13.3%.
Yield—77%.

Example 4.—Continuous nitration of toluene

|  | Grams per minute |
|---|---|
| Added nitric acid (97.0%) | 250 |
| Added toluene | 19 |
| Formed nitro compounds | 36 |
| Evaporated $HNO_3$ | 43 |

Composition of the nitro compounds:
Dinitrotoluene (DNT)=51.65%
Mononitrotoluene (MNT)=48.35%
Temperature in the nitrator, 19–36° C.
Pressure in the nitrator, 21–30 mm. Hg

Example 5.—Continuous nitration of pentandiol

|  | Grams per minute |
|---|---|
| Added nitric acid (98.7%) | 550 |
| Added pentandiol | 22.5 |
| Formed nitric esters | 36 |
| Evaporated $HNO_3$ | 18 |

Composition of the nitric esters:
Mononitrate=0.8%
Dinitrate=99.2%
Temperature in the nitrator, 22–28° C.
Pressure in the nitrator, 9–26 mm. Hg In the present method it is desirable to use an agent which does not have a strong affinity to nitrous acid. Sulphuric acid forms the relatively stable $HNOSO_4$. Phosphoric acid, on the other hand, does not retain the nitrous acid, but easily loses it under vacuum. The stability of the resulting process is increased considerably, as shown by the following tests carried out by the inventors:

DECOMPOSITION OF PROPANEDIOL DINITRATE, SEPARATED FROM DIFFERENT SPENT ACIDS, AT ATMOSPHERIC PRESSURE AND IN VACUUM

| No. | Initial State | | | | Final State | |
|---|---|---|---|---|---|---|
|  | Analysis of the Spent Acid Phase | | Analysis of the Propane Diol Dinitrate Phase | | Percent $HNO_2$ Formed in the Propanediol Dinitrate Phase after Heating for 2 Hours at 40° C. | |
|  | Percent $HNO_3$ | Mol ratio ($H_2O$) ($H_2SO_4$) | Percent $HNO_3$ | Percent $HNO_2$ | Percent $HNO_2$ at atmospheric pressure (760 mm.) | Percent $HNO_2$ at ca. 20 mm. Hg |
| 1 | 7.24 | 1.22 | 7.61 | 0.007 | 1.28 | 0.02 |
| 2 | 7.80 | 1.29 | 7.87 | 0.004 | 2.41 | 0.07 |
| 3 | 9.34 | 1.13 | 10.39 | 0.002 | 2.22 | 0.06 |
| 4 | 9.28 | 1.07 | 11.52 | 0.002 | 0.94 | 0.10 |
| 5 | 13.79 | 1.16 | 13.51 | 0.008 | 1.33 | 0.02 |
| 6 | 15.55 | 1.37 | 15.29 | 0.003 | 0.34 | 0.06 |

We claim:
1. In the method of continuously manufacturing a nitrated organic compound with a boiling point substantially higher than that of concentrated nitric acid by nitrating a nitratable organic compound, in the absence of a volatile organic solvent, the improvement which comprises continuously feeding into a reaction vessel having a reaction chamber, a nitratable organic compound chosen from the group consisting of glycerol, ethylene glycol, propene glycol, pentamethylene glycol, diethylene glycol, tri-ethylene glycol, mannitol, sorbitol, pentaerythritol, toluene, cymene, hexamine, and the halogen derivatives of toluene and cymene, having a boiling point substantially higher than the boiling point of concentrated nitric acid, continuously feeding an excess of concentrated nitrating acid into said reaction vessel, the nitratable organic compound and the nitrating acid being substantially the only reagents fed into the reaction chamber, maintaining the reaction chamber within the vessel at a reduced pressure which is markedly lower than atmospheric pressure but higher than the pressures at which said manufactured nitrated organic compound and said nitratable organic compound evaporate at the nitrating temperature and which is lower than the pressure at which nitrogen oxides evolved during the nitration evaporate, effecting the nitration of said nitratable organic compound at said reduced pressure, and continuously evaporating at said reduced pressure a sufficient quantity of the nitrating acid from the reaction chamber to remove the heat evolved in the nitration reaction, whereby to stabilize the temperature of the contents of the reaction vessel, and continuously draining the mixture of nitrated product and spent nitrating acid from the reaction vessel.

2. The method as in claim 1 wherein said nitrating acid is a mixture of nitric acid and a water absorbing agent chosen from the group consisting of oleum, sulfuric acid, phosphorus pentoxide, phosphoric acid, magnesium nitrate, calcium nitrate and zinc nitrate.

3. The method as in claim 1 wherein said nitrating acid is substantially nitric acid.

References Cited

UNITED STATES PATENTS

| | | | |
|---|---|---|---|
| 2,294,849 | 9/1942 | Olin et al. | 260—467 |
| 2,435,314 | 2/1948 | Kokatnur | 260—467 |
| 2,683,164 | 7/1954 | Bronstein | 260—467 |

LELAND A. SEBASTIAN, *Primary Examiner.*